United States Patent [19]

Darling et al.

[11] Patent Number: 4,920,537
[45] Date of Patent: Apr. 24, 1990

[54] METHOD AND APPARATUS FOR NON-INTRUSIVE BIT ERROR RATE TESTING

[76] Inventors: Andrew S. Darling, 10725 Santa Anita Terrace, Damascus, Md. 20872; Mark R. Testardi, 17128 King James Way #202, Gaithersburg, Md. 20877

[21] Appl. No.: 215,394

[22] Filed: Jul. 5, 1988

[51] Int. Cl.5 ............................................. G06F 11/00
[52] U.S. Cl. ................................... 371/5.1; 371/20.1; 371/40.1
[58] Field of Search ................... 371/2.1, 5.1, 5.2, 5.3, 371/5.4, 5.5, 40.1, 37.1, 46, 49.1, 20.1, 47.1

[56] References Cited

U.S. PATENT DOCUMENTS

| | | | |
|---|---|---|---|
| 3,315,228 | 4/1967 | Futerfas et al. | 371/47.1 |
| 3,596,245 | 7/1971 | Finnie et al. | 371/47.1 |
| 3,725,860 | 4/1973 | Kemper et al. | 371/5.4 |
| 3,760,354 | 9/1973 | Ginn | 371/69 |
| 3,824,548 | 7/1974 | Süllivan et al. | 371/20.5 |
| 3,914,740 | 10/1975 | Han | 371/47.1 |
| 3,916,379 | 10/1975 | Dulaney et al. | 371/47.1 |
| 4,234,954 | 11/1980 | Lange et al. | 371/5.1 |
| 4,397,020 | 8/1983 | Howson | 371/361 |
| 4,428,076 | 1/1984 | Schuon | 371/5.1 |
| 4,628,507 | 12/1986 | Otani | 371/5.2 |
| 4,703,453 | 10/1987 | Shinoda | 371/40.1 |
| 4,710,924 | 12/1987 | Chum | 371/5.1 |
| 4,713,810 | 12/1987 | Chum | 371/5.1 |
| 4,736,377 | 4/1988 | Bradley et al. | 371/37.1 |
| 4,742,518 | 5/1988 | Shedd | 371/5.1 |
| 4,747,105 | 5/1988 | Wilson | 371/5.4 |
| 4,800,562 | 1/1989 | Hicks | 371/5.1 |
| 4,817,052 | 3/1989 | Shinoda | 371/2.1 |
| 4,821,270 | 4/1989 | Mauge | 371/5.4 |

Primary Examiner—Michael R. Fleming

[57] ABSTRACT

This invention comprises a method and apparatus for determining the bit error rate (BER) between two points of a digital communications circuit carrying an arbitrary data stream. Block check codes calculated at one point are compared with those calculated at the other. The block check codes are computed on blocks composed of samples of the data. The block size and sampling algorithm are chosen in such a way as to allow a statistically reliable BER result to be derived from the block check code miscompare information.

11 Claims, 4 Drawing Sheets

METHOD AND APPARATUS FOR NON-INTRUSIVE BIT ERROR RATE TESTING

BACKGROUND OF THE INVENTION

1. Field of the Invention

This invention pertains to the in-service measurement of the bit error rate (BER) of a data stream in a digital communications circuit.

2. Description of the Related Art

A method commonly used to measure errors in a digital communications circuit is described in U.S. Pat. Nos. 3,315,228, 3,596,245, 3,725,860, 3,760,354, 3,824,548, 3,914,740, and 4,428,076. This method uses a code or pattern generator which injects a known test pattern into a digital communications circuit. At the other end of the circuit the received pattern is compared with a synchronized, locally generated version of the known test pattern (see FIG. 1). This comparison yields a count of bit errors. The BER is derived by dividing the number of bit errors by the total number of bits observed.

U.S. Pat. No. 4,234,954 describes a method in which signal level violations are detected, accumulated, and used to estimate the communications circuit BER.

U.S. Pat. No. 4,397,020 describes a method where cyclic redundancy codes (CRCs) are used to detect errors in a communications circuit. The CRC is calculated at the transmit end on a block of 4632 bits and then embedded into the data. At the receive end, the CRC is recalculated on the same block of data and compared to the embedded CRC; any differences indicate the presence of errors.

The prior art suffers from one of two major disadvantages: it either requires the communications circuit to be taken out of service (hence, it is termed an out-of-service test), or it requries the data to be altered (hence, it is an intrusive test).

U.S. Pat. Nos. 4,710,924 and 4,713,810 describe a technique for storing BER results in remote monitoring points along a digital communications circuit for subsequent retrieval. This technique provides the means to isolate faulty sections of the communications circuit. However, this technique does not address the method of measuring the BER.

U.S. Pat. No. 3,916,379 and commonly owned U.S. Pat. No. 4,736,377 describe a method of non-intrusive testing that employs a secondary digital communications channel. Synchronization information and error codes or cyclic redundancy codes (CRCs) are sent from one end of the digital communications circuit to the other end via this secondary channel. These codes, which in the prior art are computed over adjacent, uniformly sized blocks composed of contiguous bits of data, are compared to codes identically computed on the received digital information; each miscompare is accumulated as a block error. In U.S. Pat. No. 3,916,379, the BER is then estimated from the number of block errors. However, this estimate rapidly loses accuracy as the block error rate (BLER) approaches unity (i.e., at high BERs and/or large block sizes). Furthermore, if the block size is reduced to accommodate high BERs, then the secondary channel bandwidth required to transmit the error codes increases proportionally. This is a disadvantage since secondary channel bandwidth is usually limited by cost and availability.

SUMMARY OF THE INVENTION

The present invention avoids the shortcomings of the prior art by providing a method and apparatus to accurately determine the BER of a data stream in a digital communications circuit without taking the circuit out of service and without necessarily altering the content of the data stream.

This method involves comparing block check codes computed on blocks composed of samples of data taken at two points in a digital communications circuit and using the comparison to determine the bit error rate. (A block check code is a data word derived by performing a specified function on a block of data, where the size of the data word is generally much smaller than the size of the block. If the block of data is altered in any way (as by errors), the block check code computation will almost always yield a different result.) Some means of synchronizing the sampling and block check code generation at one point with the sampling and block check code generation at the other point must be provided to ensure that the block check codes are computed over the same bits of the digital data at both points. A secondary communications channel is employed to transfer the block check codes generated at one or both points to a common point for comparison. This second channel may also be used to transfer synchronizing information.

At the point where the block check codes are compared, counts are maintained of the number of "miscompares" and the total number of codes compared. The number of miscompares divided by the total number of block check codes compared during a give period yields an accurate estimate of the block error rate. Assuming that bit errors are Gaussian in distribution (i.e., each bit has the same probability of being in error), a give BER results in a block error rate expressed by the following formula:

$$BLER = 1 - (1 - BER)^{SIZE} \qquad (1)$$

where SIZE is the number of bits contained in each block. Solving this equation for the BER gives:

$$BER = 1 - (1 - BLER)^{1/SIZE} \qquad (2)$$

It is evident that an accurate estimate of the block error rate is necessary in order to give a good measurement of the BER. From Equation (1) it can be seen that as the BER or the block size increases, the BLER approaches unity (saturation). As the BLER approaches saturation, it is necessary to wait longer to accumulate a sufficient number of unerrored blocks to give an accurate representation of the "long-term" block error rate.

To avoid saturation of the BLER as the BER increases, it is necessary to decrease the block size. This invention allows the block size to be reduced without increasing the rate at which the block check codes are transferred, thereby minimizing the required bandwidth of the aforementioned secondary channel. This is accomplished by computing block check codes on blocks composed of samples of the data bits rather than all the data bits. More specifically, each of these blocks is composed of all data sampled within a time period. The sampled data may comprise non-adjacent segments of the data stream and/or isolated bits taken at periodic or "randomized" intervals according to a sampling algorithm. The size of these blocks, which is determined by the sampling algorithm and the time period, is chosen such that the block error rate does not approach saturation. FIG. 2 shows a generalized algorithm for sampling the communications circuit data bits and dividing the sampled data into blocks over which the block check codes are calculated.

The fact that block check codes are calculated and compared on a sample of the channel data rather than on all the data does not affect the bit error rate as determined using Equation (2) because, assuming Gaussianly distributed errors, each bit of the sample has exactly the same probability of being errored as every other bit in the channel data.

This technique is also suitable for determining BER in the case of non-Gaussian errors (e.g., error "bursts"), provided that the error distribution is not correlated with the sampling. To ensure that the BER being calculated is accurate, it is useful to reduce the block size and recompute the BER. If the recomputed BER is substantially different than the original BER, this indicates the presence of error bursts. The block size should be successively reduced until no substantial change in the calculated BER is realized.

DETAILED DESCRIPTION OF THE PREFERRED EMBODIMENT

Figure 1:
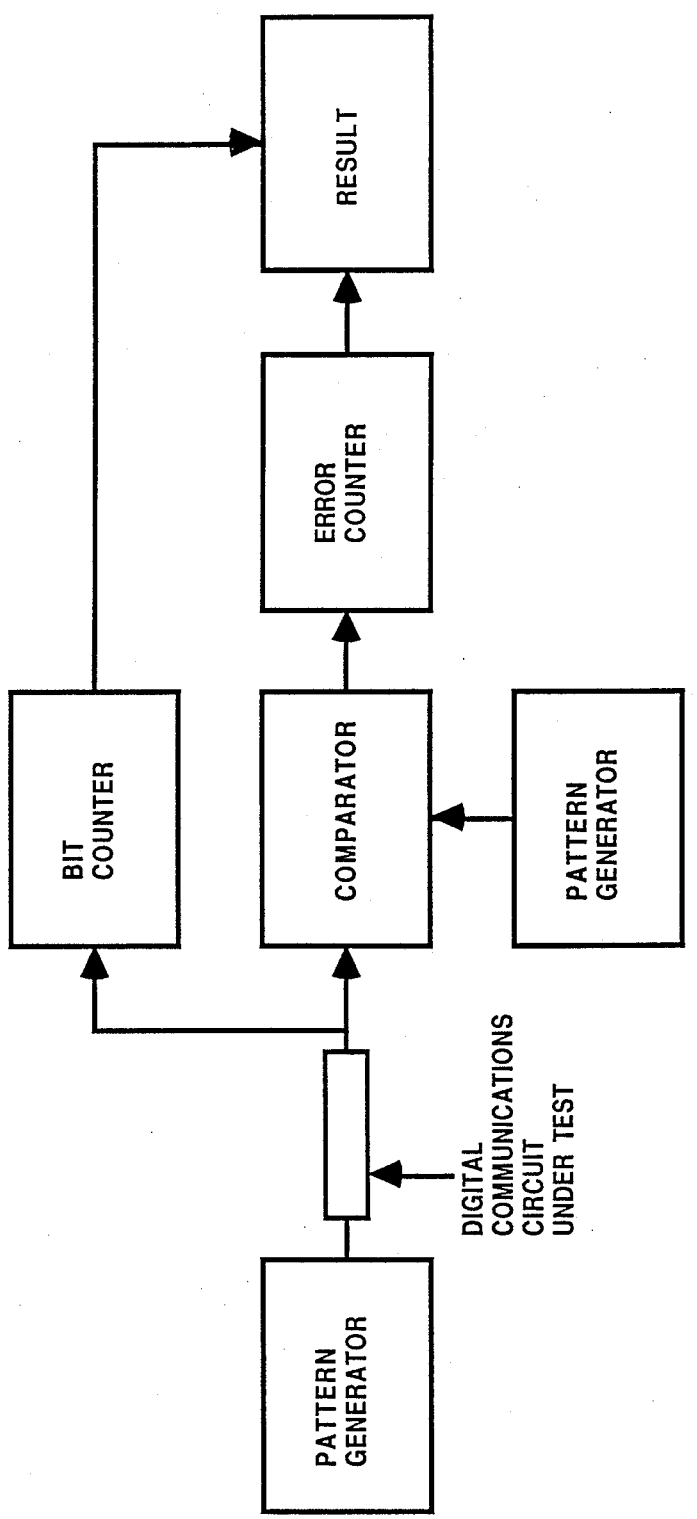
FIG. 1 shows a typical BER test set-up of the prior art.
Figure 2:
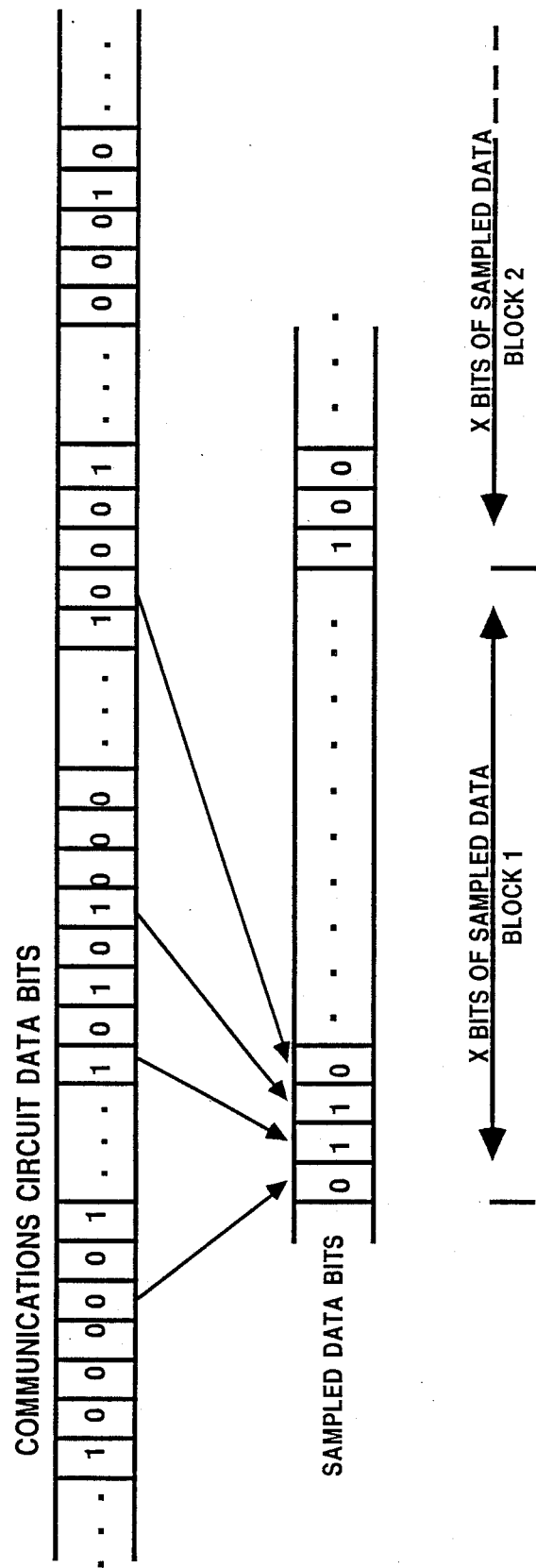
FIG. 2 shows the generalized sampling algorithm and block generation of the invention.
Figure 3:
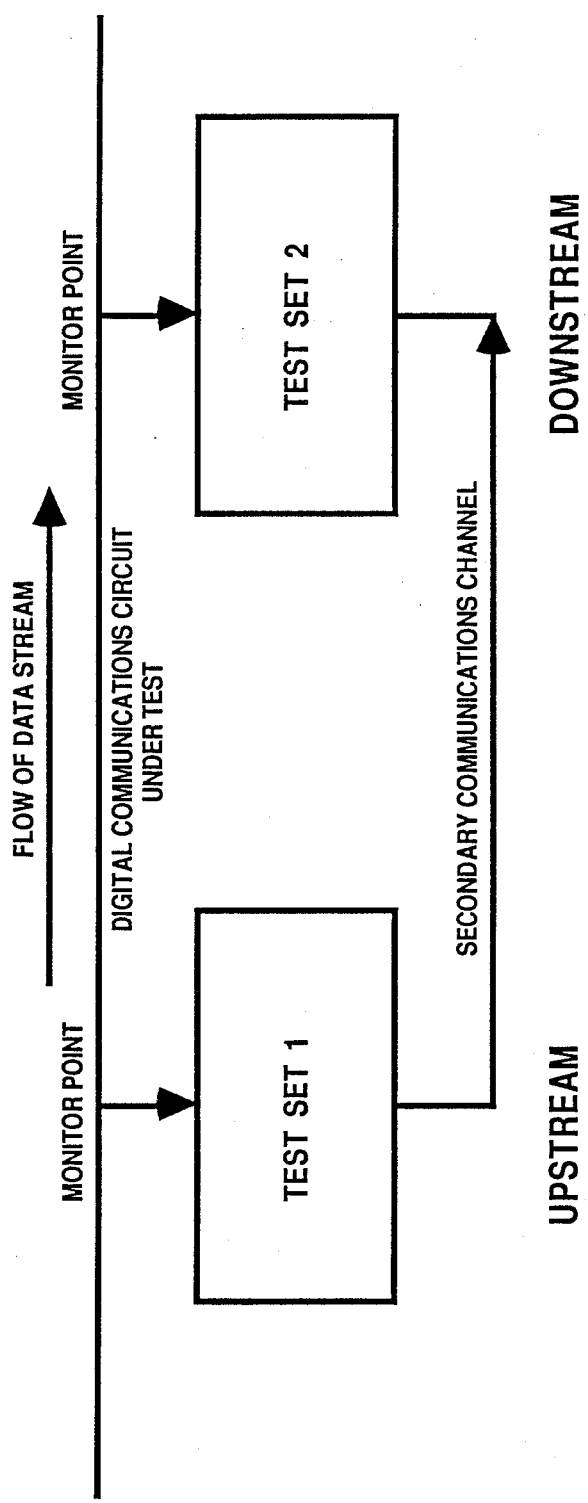
FIG. 3 shows a non-intrusive test set-up.

The apparatus for non-intrusive bit error rate testing according to the preferred embodiment is diagrammatically shown in FIG. 3. Each of the test sets shown in FIG. 3 comprises the block elements shown in FIG. 4. Additionally, synchronization circuits (as described, for example, in the aforementioned commonly owned U.S. Pat. No. 4,736,377, incorporated herein by reference) allow the two test sets to identify and begin monitoring at a common point in the digital data stream. This ensures that at each of the monitor points in FIG. 3, the block check codes are computed on blocks composed of data bits that represent the same positions in the data stream carried by the digital communications circuit.

Figure 4:
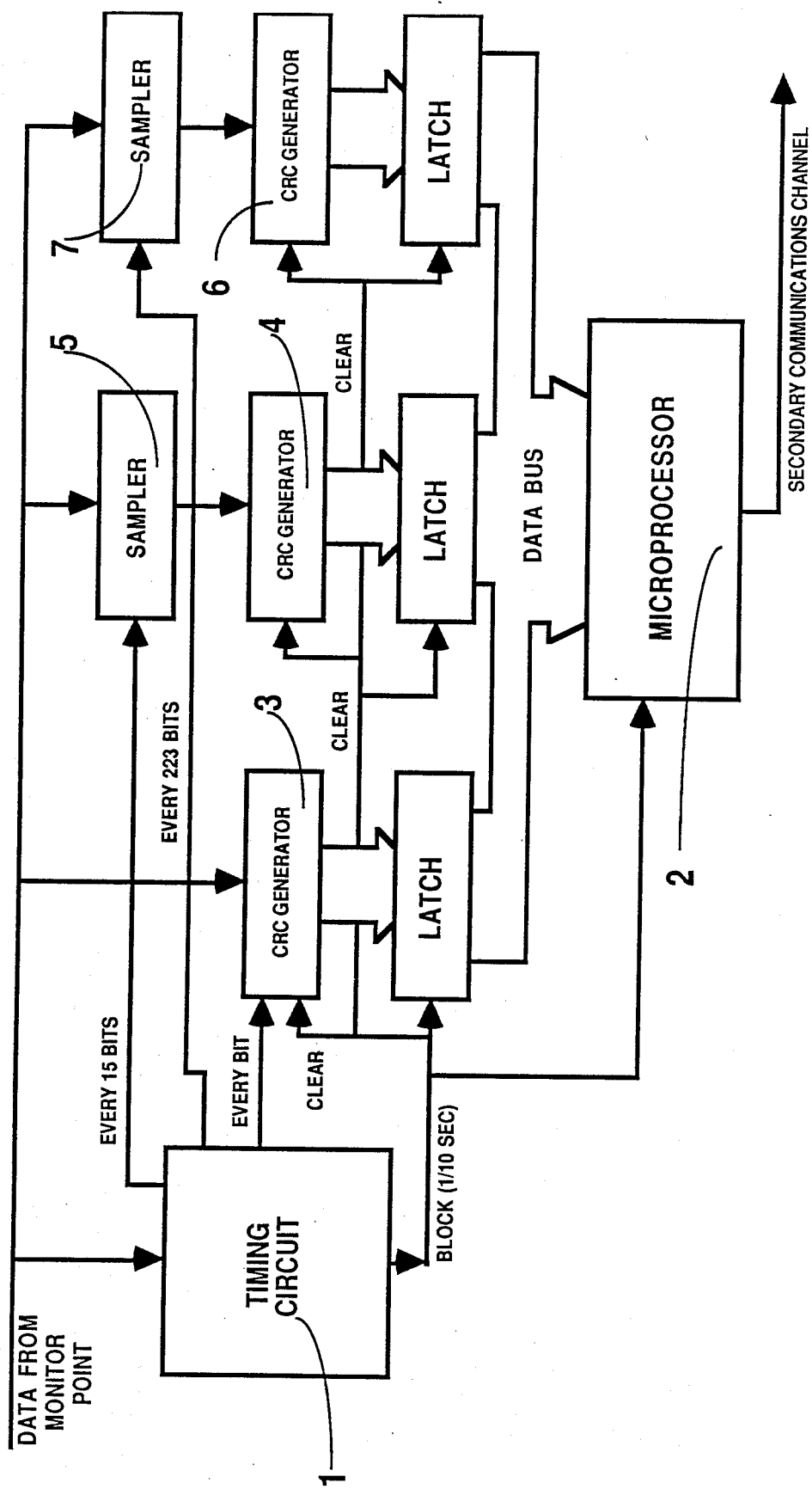
FIG. 4 shows a block diagram of the preferred embodiment of the invention.

FIG. 4 shows a block diagram of the preferred embodiment of the invention. A timing circuit 1 generates sample pulses synchronized to the monitored digital data. One output of the timing circuit provides one pulse for each data bit; another output provides one pulse for each 15 monitored bits, and a third output provides one pulse for each 223 monitored bits. The timing circuit also generates a "block" signal every 1/10 second; this signal is used to latch the outputs of the three CRC generators and then clear the generators for the next block of data. Following the "block" signal, the microprocessor 2 reads the CRC information latched from the three CRC generators.

The first CRC generator 3 computes a 12-bit CRC word over every bit of the monitored data (sampling is not employed). The second CRC generator 4 receives every 15th bit of the monitored data from its sampler 5 and computes a 6-bit CRC word on these bits. The third CRC generator 6 receives every 223rd bit of the monitored data from its sampler 7 and computes a 6-bit CRC word on these bits.

The effect of the sampling employed in the second and third CRC generators is that the second CRC is computed on only 1/15 as many bits as the CRC produced by the first CRC generator, and the third CRC is computed on 1/223 as many bits as the first CRC. The CRCs produced by the first, second, and third CRC generators can be described, then, as "large block", "medium block", and "small block" CRCs, respectively.

Every 1/10 second, the three CRCs are sent by the microprocessor 2 from the upstream test set to the downstream test set via a secondary communications channel (see FIG. 3). The downstream test set calculates CRCs in the same manner as the upstream test set and compares the CRCs it has generated with those received from the upstream test set. "Miscompares" are counted as block errors, with the small, medium, and large block CRC errors being accumulated separately. By dividing these error counts by the total number of 1/10 second blocks, block error rates for each of the three block sizes are obtained. The microprocessor converts the block error rates into bit error rates using Equation 2.

It is important to note that if for a given block size there is an insufficient number of errored blocks or an insufficient number of unerrored blocks, the BER measurement derived from that block error rate will be statistically unreliable. For example, it is advantageous to define a reliability or selection criteria that requires that at least 10 errored blocks and at least 10 unerrored blocks be accumulated before using the block error rate to compute the BER.

If the accumulated block error statistics for two or more block sizes meet the reliability criteria, the BER measurements derived from the different block sizes are compared. If the measurements are substantially the same, then the errors on the digital communication circuit are predominantly Gaussian, and the BER results represent a high degree of confidence. If the BER result derived from one CRC block size differs significantly from the BER derived from another block size, then the microprocessor determines that burst errors are present on the communications circuit under test. In either case, the smallest CRC block size that meets the aforementioned reliability criteria is selected by the microprocessor as yielding the best estimation of the actual BER.

If the Gaussian or non-Gaussian nature of the error distribution in the digital communications circuit under test does not need to be determined, it is sufficient to always compute the BER based on the smallest CRC block size that meets the reliability criteria. At low bit error rates, this will mean that the large block CRC information is initially used to compute the BER, with a switch to the medium block and then the small block as soon as sufficient block errors are accumulated for each block size.

Depending upon the computation method used, it may be difficult for the microprocessor to accurately evaluate the BER using Equation (2) when the block size is large and the block error rate is small. For low block error rates, a good approximation of the BER is given by $$\text{BER} = \text{BLER}/\text{SIZE} \tag{3}$$

This gives results that differ from those given by Equation (2) by 5 percent at a block error rate of $10^{-1}$;

it is an even better approximation at lower block error rates.

It should be mentioned that the 1/10 second block duration and various CRC block sizes used in this preferred embodiment of the invention were chosen for analyzing a digital communications circuit carrying data at 1.544 megabits per second (North American T1 rate) using a secondary communications channel of 1200 bits per second capacity. Since only 240 bits per second are required to carry the CRC information over the secondary channel, 960 bits per second remain to be used for achieving and confirming synchronization between the two tests sets, and for error detection (and correction, if desired) on the CRC formation. It is vital to perform at least error detection on CRC words to avoid attributing secondary channel errors to the digital communications circuit under test.

The choice of the CRC polynomial is based on its ability to distinguish between errored blocks and unerrored blocks. An $n^{th}$ order CRC polynomial produces an n-bit CRC word that is capable of detecting $(2^n-1)/(2^n)$ of all possible combinations of errors in the block over which it is computed. A 12th order CRC polynomial is used for the large block (computed over every bit) because it provides a high degree of confidence that errors occurring the digital communications circuit under test will not go undetected. This allows the number of errored seconds (an important measurement in the communications industry) to be accurately determined. The medium and small CRC blocks employ 6-bit CRCs to save secondary channel bandwidth. High accuracy is not as important on these smaller block sizes because they represent statistical samples of the data and are used to compute BER, where the accuracy usually does not need to be known with such a high degree of confidence.

The primary advantage of this invention is that it is capable of measuring the BER of a digital communications circuit using substantially less secondary channel bandwidth than the prior art. Furthermore, this measurement may be made without interrupting or altering the data carried by the circuit. This allows "down time" to be minimized during troubleshooting and routine maintenance of digital communications circuits.

Those skilled in the art will recognize various modifications which may be employed in conjunction with this invention, such as:
1. The use of different intervals between sampled bits.
2. The use of different sampling algorithms.
3. The use of different block sizes.
4. Adjusting the sampling algorithm and/or block size according to an actual or anticipated block error rate.
5. The use of a different number of CRC blocks.
6. The use of randomized sampling of the data.
7. The use of a cooling fan to dissipate heat generated by the circuitry.
8. The use of different CRC polynomials.
9. The use of a block check code of a type other than CRC.
10. Embedding the secondary communications channel in the digital communications circuit under test.
11. The use of the block check code miscompare information to derive other performance measurements that are representative of the BER.
12. Dividing the sampled data bits into blocks based on a number of sampled data bits rather than on time duration when a "randomized" sampling algorithm is employed.

Therefore, the scope of this invention is not to be limited to the described preferred embodiment, but shall embrace the ideas and concepts of the appended claims.

We claim:

1. A method of measuring a bit error rate of a data stream in a digital communications circuit comprising the steps of:
   repeatedly intermittently sampling data bits in the data stream according to a sampling algorithm at upstream and downstream monitor points to produce upstream and downstream sets of sampled data bits;
   dividing the upstream set of sampled data bits into upstream blocks of predetermined block size;
   computing upstream block check codes on the upstream blocks;
   dividing the downstream set of sampled data bits into downstream blocks of predetermined block size;
   computing downstream block check codes on the downstream blocks;
   synchronizing the sampling of the data bits at the upstream and downstream monitor points, the dividing of the upstream and downstream sets of sampled data bits into the upstream and downstream blocks, and the computing of the upstream and downstream block check codes in order to ensure that the upstream block check codes are computed on the upstream blocks that are made up of the data bits that represent the same positions in the data stream as the data bits that make up the downstream blocks on which the downstream block check codes are computed;
   comparing the upstream block check codes that are computed on the upstream blocks that are made up of the data bits that represent the same positions in the data stream as the data bits that make up the downstream blocks on which the downstream block check codes are computed and the downstream block check codes with each other to determine a number of miscompares; and
   determining a bit error rate or a quantity representative thereof based on the number of miscompares.

2. The method of claim 1, wherein the step of repeatedly intermittently sampling data bits comprises periodic sampling.

3. The method of claim 1, wherein the steps of computing block check codes on the upstream and downstream blocks comprise computing cyclic redundancy codes (CRCs).

4. The method of claim 1, wherein the step of determining the bit error rate comprises the steps of:
   computing a block error rate based on the number of miscompares of the upstream and downstream block check codes with each other; and
   determining the bit error rate or a quantity representative thereof from the block error rate.

5. The method of claim 4, further comprising the step of:
   selecting the block size of the upstream and downstream blocks based on a reliability criteria.

6. A system for measuring a bit error rate of a data stream in a digital communications circuit comprising:
   means for repeatedly intermittently sampling data bits in the data stream according to a sampling algorithm at upstream and downstream mointor points to produce upstream and downstream sets of sampled data bits;

means for dividing the upstream set of sampled data bits into upstream blocks of predetermined block size;

means for computing upstream block check codes on the upstream blocks;

means for dividing the downstream set of sampled data bits into downstream blocks of predetermined block size;

means for computing downstream block check codes on the downstream blocks;

means for synchronizing the sampling of the data bits at the upstream and downstream monitor points, the dividing of the upstream and downstream sets of sampled data bits into the upstream and downstream blocks, and the computing of the upstream and downstream block check codes in order to ensure that the upstream block check codes are computed on the upstream blocks that are made up of the data bits that represent the same positions in the data stream as the data bits that make up the downstream blocks on which the downstream block check codes are computed;

comparison means for comparing the upstream block check codes that are computed on the upstream blocks that are made up of the data bits that represent the same positions in the data stream as the data bits that make up the downstream blocks on which the downstream block check codes are computed and the downstream block check codes with each other to determined a number of miscompares; and determining means for determining a bit error rate or a quantity representative thereof based on the number of miscompares.

7. The system of claim 6, wherein the means for repeatedly intermittently sampling data bits comprises means for performing periodic sampling.

8. The system of claim 6, wherein the means for computing block check codes on the upstream and downstream blocks comprise means for computing cyclic redundancy codes (CRCs).

9. The system of claim 6, wherein the determining means comprises:

means for computing a block error rate based on the number of miscompares of the upstream and downstream block check codes with each other; and means for determining the bit error rate or a quantity representative thereof from the block error rate.

10. The system of claim 9, futher comprising:

means for selecting the block size of the upstream and downstream blocks based on a reliability criteria.

11. A method of measuring a bit error rate of a data stream in a digital communications circuit comprising the steps of:

repeatedly intermittently sampling data bits in the data stream according to a plurality of sampling algorithms at upstream and downstream monitor points to produce a plurality of upstream sets of sampled data bits and a plurality of downstream sets of sampled data bits such that each of the plurality of upstream sets of sampled data bits corresponds to one of the plurality of downstream sets of sampled data bits;

dividing each of the plurality of upstream sets of sampled data bits into upstream blocks having a predetermined block size such that the predetermined block size for any one of the plurality of upstream sets of sampled data bits differs from the predetermined block size for any other of the plurality of upstream sets of sampled data bits;

computing upstream block check codes on the upstream blocks for each of the plurality of upstream sets of sampled data bits;

dividing each of the plurality of downstream sets of sampled data bits into downstream blocks having a predetermined block size such that the predetermined block size for any one of the plurality of downstream sets of sampled data bits differs from the predetermined block size for any other of the plurality of downstream sets of sampled data bits;

computing downstream block check codes on the downstream blocks for each of the plurality of downstream sets of sampled data bits;

synchronizing the sampling of the data bits at the upstream and downstream monitor points, the dividing of the upstream and downstream sets of sampled data bits into the upstream and downstream blocks, and the computing of the upstream and downstream block check codes in order to ensure that for each of the plurality of upstream sets of sampled data bits and its one corresponding downstream set of sampled data bits, the upstream block check codes are computed on the upstream blocks that are made up of the data bits that represent the same positions in the data stream as the data bits that make up the downstream blocks on which the downstream block check codes are computed;

comparing the upstream block check codes for each of the plurality of upstream sets of sampled data bits with the downstream block check codes for the corresponding downstream set of sampled data bits to determine a number of miscompares for each of the plurality of upstream sets of sampled data bits and its one corresponding downstream set of sampled data bits;

determining a selection criteria;

selecting one of the plurality of upstream sets of samped data bits and its one corresponding downstream set of sampled data bits based on the selection criteria; and determining a bit error rate or a quantity representative thereof based on the determined number of miscompares for the one selected upstream set of sampled data bits and its corresponding downstream set of sampled data bits.

* * * * *